United States Patent [19]

Kasik

[11] Patent Number: 5,542,408
[45] Date of Patent: Aug. 6, 1996

[54] GUARD FOR A COOKING DEVICE

[76] Inventor: David P. Kasik, 15921 Cottage Grove Ave., South Holland, Ill. 60473

[21] Appl. No.: 408,929

[22] Filed: Mar. 20, 1995

[51] Int. Cl.$^6$ .................................................. F24C 15/36
[52] U.S. Cl. .................................... 126/201; 126/25 R
[58] Field of Search .......................... 126/42, 201, 41 R, 126/544, 545, 298, 25 R; 237/79

[56] References Cited

U.S. PATENT DOCUMENTS

| 907,010 | 12/1908 | Davidson | 126/201 |
|---|---|---|---|
| 1,332,474 | 3/1920 | Skelly | 126/201 |
| 1,440,336 | 12/1922 | Buffington | 126/201 |
| 4,314,543 | 2/1982 | Bullington et al. | 126/201 |
| 5,165,384 | 11/1992 | Knutson | 126/201 |

FOREIGN PATENT DOCUMENTS 2207996  2/1989  United Kingdom .................. 126/201

*Primary Examiner*—James C. Yeung
*Attorney, Agent, or Firm*—Brinks Hofer Gilson & Lione

[57] ABSTRACT

An apparatus for preventing contact with heated areas of a cooking device is a three-dimensional frame having an upper and a lower perimeter, couplers to attach the frame to a cooking device, and connectors configured and positioned to prevent contact with the heated surfaces of a cooking device.

9 Claims, 1 Drawing Sheet

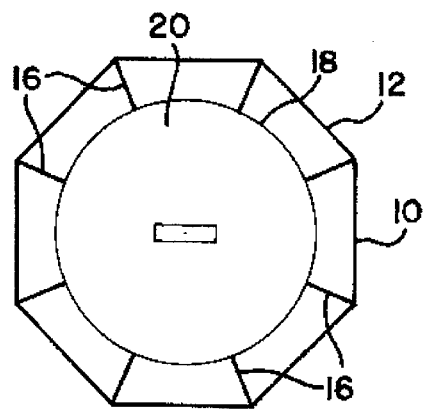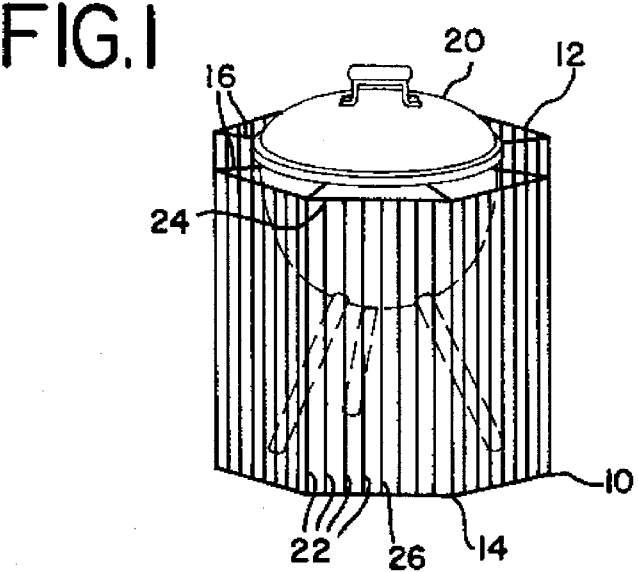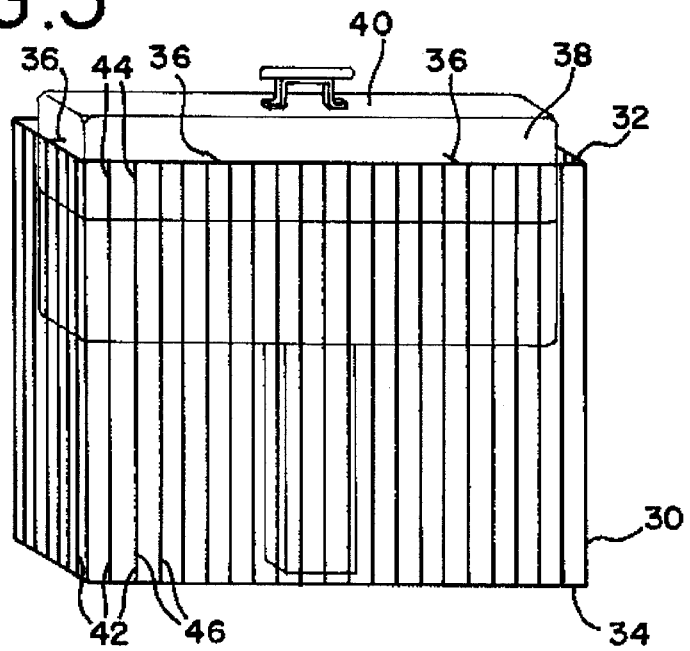

GUARD FOR A COOKING DEVICE

The invention relates generally to a guard for a cooking device. More particularly, the apparatus prevents contact with heated surfaces of a cooking device, for example, a barbecue grill for outdoor cooking.

Although many types of cooking devices are available, guards or shields to protect against dangerous contact with the heated surfaces of the cooking device are not available. Dangerous contact by children and animals is a particular risk with heated surfaces of cooking devices such as a barbecue grill. Examples of such barbecue grills include the popular "Weber®" grill, an outdoor gas grill and a hibachi.

Risks associated with cooking devices include burning of the skin or clothing. Such burning may be inadvertent during movement near the cooking device. Such cooking devices typically do not include any sort of guard for preventing contact with heated surfaces. Moreover, for cooking devices such as barbecue grills, the entire outer surface of the cooking device may get very hot, including the top, side and bottom surfaces.

These risks are particularly hazardous for children and animals. Unlike adults they many not be tall enough to see the burning coals or gas flame of the grill. Also, the center surface of the cooking device may present no apparent indication of being hot to the touch. Children or animals running or walking in the vicinity of the cooking device may have no indication of the dangerously hot conditions presented.

The present invention provides an inexpensive and easy to handle apparatus to guard against contact with heated surfaces of a cooking device.

SUMMARY

An apparatus for preventing contact with heated areas of a cooking device includes (a) a three-dimensional frame that has an upper perimeter and a lower perimeter; said perimeters are spaced from the cooking device by a predetermined amount that is, far enough to prevent contact with the heated surfaces, but not so far as to interfere with cooking; the lower perimeter is contiguous to a surface on which the cooking device is positioned, usually the ground;

(b) a plurality of couplers engage the cooking device to support the frame relative to the cooking device;

(c) a plurality of connectors wherein each connector has a first end and a second end, said first end fixedly attached to the upper perimeter and the second end fixedly attached to the lower perimeter, of the frame.

In an illustrative embodiment, the three-dimensional frame is an upright, cylindrical frame, said upper perimeter and said lower perimeter are generally circular, and said cooking device is a round barbecue grill positioned on the ground, said grill supported by a plurality of legs positioned between the grill and the ground. This embodiment is suitable for the popular "Weber®" grills.

In this embodiment, a connector of the plurality of connectors is a rod having a first end and a second end, said first end fixedly attached to the upper perimeter and said second end fixedly attached to said lower perimeter. Each connector of said plurality of connectors is positioned relative to the connector on either side of it by a predetermined distance and configuration. For example, a connector of the plurality of connectors is positioned at a one inch interval, from another connector on either side, and the plurality of connectors is configured so that the rods are parallel to each other and substantially perpendicular to the upper perimeter and to the lower perimeter.

In another embodiment, the plurality of connectors are circular bars positioned about one inch apart one from the other, and are configured parallel to the upper perimeter and to the lower perimeter. A coupler is a spring clip or hook.

In yet another embodiment, the three-dimensional frame is generally a right polyhedron with a polygonal upper perimeter and lower perimeter. For a cooking device that is a rectangular grill possibly supported on the ground by a leg, a three-dimensional frame which is an upright cage having a rectangular upper and lower perimeter is preferred.

The guard is optionally designed to form a unit capable of being transported with the cooking device. In this embodiment, a support structure links the frame (cage) with the cooking device. The support structure may link to the cooking device by an attachment between the lower perimeter of the frame and the structure supporting the cooking device on a surface, said structure being, for example, legs on a circular barbecue grill. Alternatively, links are positioned intermediate between said upper perimeter and said lower perimeter of the frame.

The support structure is spaced relatively firmly to maintain a fixed proximity to the cooking device, even if the cooking device is moved from one place to another. In this embodiment, the frame and the cooking device form a unitary structure that is readily transportable.

BRIEF DESCRIPTION OF THE DRAWING

FIG. 1 is a perspective view of a three-dimensional upright frame with a polyhedronal shape that is an embodiment of the apparatus of the present invention for preventing contact with heated areas of a cooking device.

FIG. 2 is a top view of the cooking device and frame of FIG. 1.

FIG. 3 is a perspective view of a three-dimensional upright frame with a rectangular shape that is an embodiment of the apparatus of the present invention for preventing contact with heated areas of a cooking device.

DESCRIPTION OF THE PREFERRED EMBODIMENT

FIG. 1 is a perspective view of a three-dimensional upright frame with a polyhedronal shape that is an embodiment of the apparatus of the present invention for preventing contact with heated areas of a cooking device. A frame 10 has an upper perimeter 12 and lower perimeter 14. A plurality of couplers 16 engage the upper perimeter 12 and the rim 18 of a cooking device 20. A plurality of connectors 22 have a first end 24 fixedly attached to the upper perimeter 12, and a second end 26, fixedly attached to the lower perimeter 14.

FIG. 2 is a top view of the cooking device 20 and frame 10 of FIG. 1. FIG. 2 shows the plurality of couplers 16 disposed between the upper perimeter 12 of the frame 10 and the rim 18 of the cooking device 20. As illustrated in FIGS. 1 and 2, the plurality of couplers 16 are preferably located at the corners between the vertical portions of the frame 10, one coupler per corner. However, the number and location of the couplers may be varied to improve the stability and rigidity of the frame 10 when engaging the cooking device 20. Alternatively, the number of couplers 16 may be reduced to decrease the cost of materials and manufacturing the frame 10.

FIG. 3 is a perspective view of a three-dimensional upright frame with a rectangular shape that is an embodiment of the apparatus of the present invention for preventing contact with heated areas of a cooking device. A frame 30 has an upper perimeter 32 and a lower perimeter 34. A plurality of couplers 36 engages the upper perimeter 32 and the rim 38 of a cooking device 40. A plurality of connectors 42 have first end 44 fixedly attached to the upper perimeter 32, and a second end 46 fixedly attached to the lower perimeter 34.

While particular embodiments of the present invention have been shown and described, modifications may be made, and it is therefor intended in the appended claims to cover all such changes which fall within the true spirit and scope of the invention.

I claim:

1. A transportable apparatus for preventing contact with heated areas of a movable cooking device situated on a surface, said apparatus not interfering with cooking, and, said apparatus comprising;
    (a) a three-dimensional frame; said frame having an upper perimeter and a lower perimeter; said upper perimeter and said lower perimeter each being spaced from the cooking device by a predetermined distance; and said lower perimeter being substantially contiguous to said surface;
    (b) a plurality of couplers; each coupler of said plurality of couplers engaging said cooking device and engaging said upper perimeter; and
    (c) a plurality of connectors; each connector of said plurality of connectors having a first end and a second end, said first end being fixedly attached to said upper perimeter and said second end fixedly attached to said lower perimeter.

2. An apparatus for preventing contact with heated areas of a cooking device as recited in claim 1, wherein said three-dimensional frame is a generally cylindrical shape, said upper perimeter and said lower perimeter each being generally circular.

3. An apparatus for preventing contact with the heated areas of a cooking device as recited in claim 1, wherein each said connector of said plurality of connectors is a rod.

4. An apparatus for preventing contact with the heated areas of a cooking device as recited in claim 1, wherein said plurality of connectors is arrayed in a predetermined pattern, said pattern being configured to preclude passage by a child's hand.

5. An apparatus for preventing contact with the heated areas of a cooking device as recited in claim 4, wherein each said connector of said plurality of connectors is positioned at a one inch interval from an adjacent said connector, and wherein said plurality of connectors is arrayed substantially in parallel and substantially perpendicular to said upper perimeter and said lower perimeter.

6. An apparatus for preventing contact with the heated areas of a cooking device as recited in claim 4, wherein the apparatus further comprises a plurality of circular bars, said bars being substantially spaced at one inch intervals; said bars being substantially parallel to said upper perimeter and to said lower perimeter.

7. An apparatus for preventing contact with heated areas of a cooking device as recited in claim 1, wherein each said coupler is a spring clip.

8. An apparatus for preventing contact with heated areas of a cooking device as recited in claim 1, wherein said three-dimensional frame is a generally right polyhedron and wherein said upper perimeter and said lower perimeter are each generally polygonal.

9. An apparatus for preventing contact with heated areas of a cooking device as recited in claim 1, wherein said three-dimensional frame is an upright cage; said upper perimeter and said lower perimeter, each being generally rectangular.

\* \* \* \* \*